3,483,021
DIMENSIONALLY STABLE WOOD
George H. Morgan and Ralph R. Langner, Lake Jackson, Tex., assignors to The Dow Chemical Company, Midland, Mich., a corporation of Delaware
No Drawing. Filed Sept. 20, 1966, Ser. No. 580,613
Int. Cl. B44d 1/26, 5/12
U.S. Cl. 117—118      4 Claims

ABSTRACT OF THE DISCLOSURE

Dimensionally stable wood is prepared by contacting the wood with a solution of dibromopropyl glycidyl ether to form an impregnated wood product and heating the impregnated wood product to no more than about 150° C. to obtain a wood product containing 1 to 75% by weight of dibromopropyl glycidyl ether.

---

This invention relates to dimensionally stable wood products and to methods for the manufacture of such products.

It is known that the exterior dimensions of wood vary with the moisture content of the wood. This variation in size due to moisture has limited the uses of untreated wood. The existence of this problem has generated a wide variety of chemical and physical methods of treating wood. Most of these methods are specialized and depend upon the intended end-use of the wood.

It has now been found that the dimensional stability of wood and wood-containing products may be improved by treating the wood or wood product with dibromopropyl glycidyl ether.

In general, the process of the invention may be applied to any species of wood. Examples of kinds of wood which may be treated with dibromopropyl glycidyl ether to improve their dimensional stability include the soft woods such as the pines (southern pines, ponderosa pine, etc.) and the hard woods (such as maple and oak). The wood may be combined with other materials either before or after treatment. For example, chipboard or other composite or laminated structures (e.g. plywood) may be treated according to the process of the invention.

According to the process of the invention, the wood products to be treated is contacted with dibromopropyl glycidyl ether to form an impregnated wood product. This treatment is ordinarily carried out in the presence of a suitable catalyst such as an alkali metal (Na, K, Li, Cs), an alkali metal oxide or hydroxide ($Na_2O$, NaOH, $K_2O$, KOH, $Li_2O$, LiOH, $Cs_2O$, CsOH), a tertiary amine (triethylamine, dimethylethylamine, etc.) or a Lewis acid ($BF_3$, $SnCl_4$, $SnCl_2$, $AlCl_3$, $TiCl_4$, $ZnCl_2$, $SbCl_3$, etc.). Any catalyst material which is suitable for catalyzing the ring-opening reaction of an oxirane (epoxide) group in the presence of a hydroxyl group may be employed. The impregnated product is then heated to complete the reaction of the dibromopropyl glycidyl ether with the wood fibers.

The preparation of the impregnated wood or wood product may be accomplished by means of a simple immersion in a suitable bath containing dibromopropyl glycidyl ether and catalyst. Other impregnation methods such as spraying, painting or vacuum techniques may also be used. As another alternative, the wood may be first treated with a bath containing the catalyst and then contacted with the dibromopropyl glycidyl ether in a separate impregnation step.

The impregnated product may be dried at room temperature and stored at ambient temperature for a time period sufficient to complete the reaction. The preferred method is to heat the impregnated wood or wood product at a temperature of from 75° to 120° C. for from about 1 to 3 hours.

The treated wood and wood products which are formed according to the process of the invention show little change in dimensions (i.e. overall volume) after being soaked in water for extended periods of time and then dried. In addition, the treated products have improved fire retardant properties. For example, wood products may be rendered self-extinguishing by impregnation with sufficient amounts of dibromopropyl glycidyl ether.

The amount of dibromopropyl glycidyl ether which is incorporated into the wood fiber (as a reaction product) may vary from about 1 to 75 percent by weight (based upon the total dry weight of the wood and chemical). Excellent results are obtained when the wood contains (in reacted form) from about 10 to 50 percent by weight of dibromopropyl glycidyl ether. When thin sheets of wood (or other wood products containing wood fibers) are treated with dibromopropyl glycidyl ether, smaller amounts of ether are required since better impregnation is obtained.

The following examples are submitted for the purpose of illustration only and are not to be construed as limiting the scope of the invention in any way.

EXAMPLES I–VI.—GENERAL PROCEDURE

Panels of southern yellow pine (dimensions: 1 inch x 4 inches x 5 inches) were selected at random from a commercial supply. The samples were weighed and measured (to determine volume) before and after treatment.

In Example I, a sample of wood was immersed for approximately 30 minutes in dibromopropyl glycidyl ether containing about 1 percent (based on the total weight of the treating composition) of triethylamine catalyst.

The wood samples used in Examples II–IV of Table 1 were each placed in a treatment cylinder (2500 milliliter capacity), the cylinder was evacuated (25 mm. of Hg or less, for a 15 minute period), the vacuum was blocked and treatment liquid was fed to the cylinder to immerse the wood panel. The cylinder was then placed under a pressure of 50 p.s.i.g. using a nitrogen pad and this pressure was held for about 30 minutes. The pressure was relieved, the liquid drained, the panel was removed and then allowed to dry at room temperature.

The dry panels were then heated at 100° C. for 2–3 hours. The volume of each treated panel was determined and each panel was entirely submerged in a water bath maintained at 25°±1° C. for 24 hours. Upon removal from the water bath, the volume of the panel was again determined. The treated panel sample was then dried in an oven at about 100° C. for 3½ hours and the volume was again determined. The magnitude of each of the volume changes was used as a measure of the dimensional stability of the particular treated sample.

The percent retention of treating compound is defined (for treated samples) as:

$$\% \text{ retention} = \left(\frac{W-D}{W}\right) \times 100$$

wherein:

W = The initial treated weight of the sample after impregnation, drying and heating at 100° C. for the time indicated in Table 1.

D = The dry weight of the untreated sample prior to heating at 100° C.

For untreated samples, the percent retention is zero (i.e. no chemical is deposited on or within the wood).

TABLE 1

| Example number: | Hours heated at 100° C. | Volume (cubic inches) after heating at 100° C. | Volume after 24-hour soak in H₂O at 25° C. | Volume after heating soaked sample for 3½ hours at 100° C. |
|---|---|---|---|---|
| I | 2 | 14.16 | 14.51 | 14.16 |
| II | 3 | 14.63 | 14.82 | 14.78 |
| III | 2 | 14.57 | 14.69 | 14.69 |
| IV | 3 | 14.57 | 14.69 | 14.69 |
| V Control | 2 | 13.10 | 14.75 | 12.6 |
| VI Control | 3 | 13.02 | 14.87 | 14.2 |

We claim as our invention:

1. A process for preparing a dimensionally stable wood product which comprises contacting wood with a treating compositon containing dibromopropyl glycidyl ether to form an impregnated wood product, and then heating said impregnated wood product to a temperature of no more than about 150° C. to obtain a wood product which contains from 1 to about 75 percent by weight, based upon the total dry weight of said wood product, of dibromopropyl glycidyl ether.

2. The process of claim 1 wherein the treating composition contains a compound suitable for catalyzing the reaction of an epoxy group and a hydroxyl or alkoxy group.

3. The process of caim 2 wherein the catalyst employed is an alkali metal, an alkali metal oxide, an alkali metal hydroxide, a tertiary amine, or a Lewis acid.

4. A wood product prepared according to the process of claim 1.

References Cited

UNITED STATES PATENTS 2,726,169   12/1955   Hudson _____ 117—147 X
3,079,214   2/1963   Berni et al. _____ 117—147 X ALFRED L. LEAVITT, Primary Examiner CHARLES R. WILSON, Assistant Examiner U.S. Cl. X.R.

117—116; 147